July 21, 1959

J. A. PERRY ET AL 2,895,558

AUTOMATIC REVERSING MECHANISM FOR TRACTOR-ATTACHED
AGRICULTURAL IMPLEMENTS

Filed June 18, 1957

INVENTORS
JOHN A. PERRY
FLOYD B. PERRY,
BY DARRELL D. PERRY,

McMorrow, Berman & Davidson
ATTORNEYS.

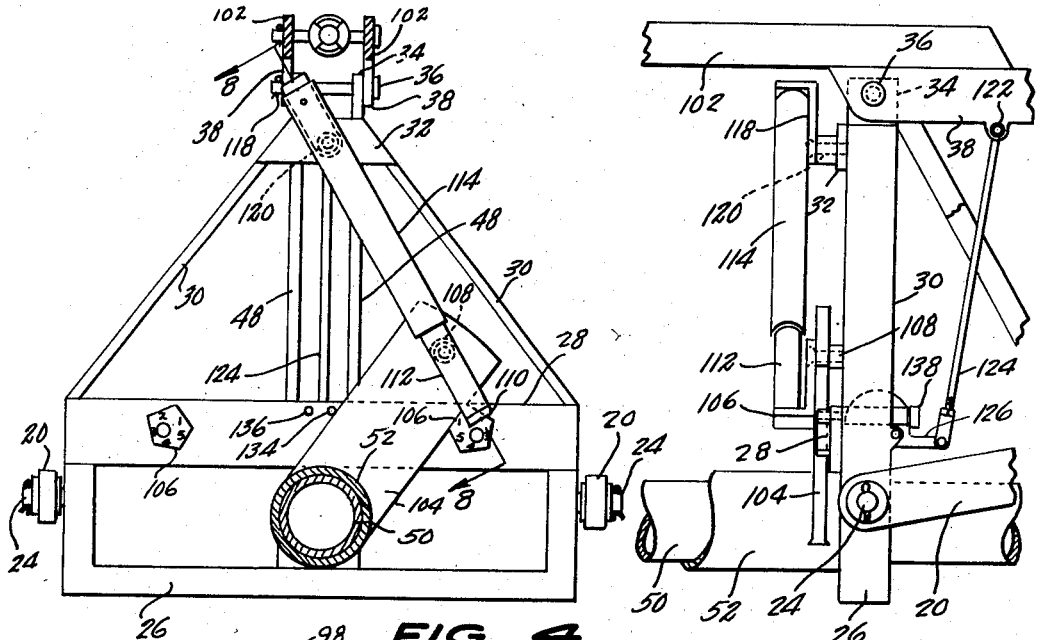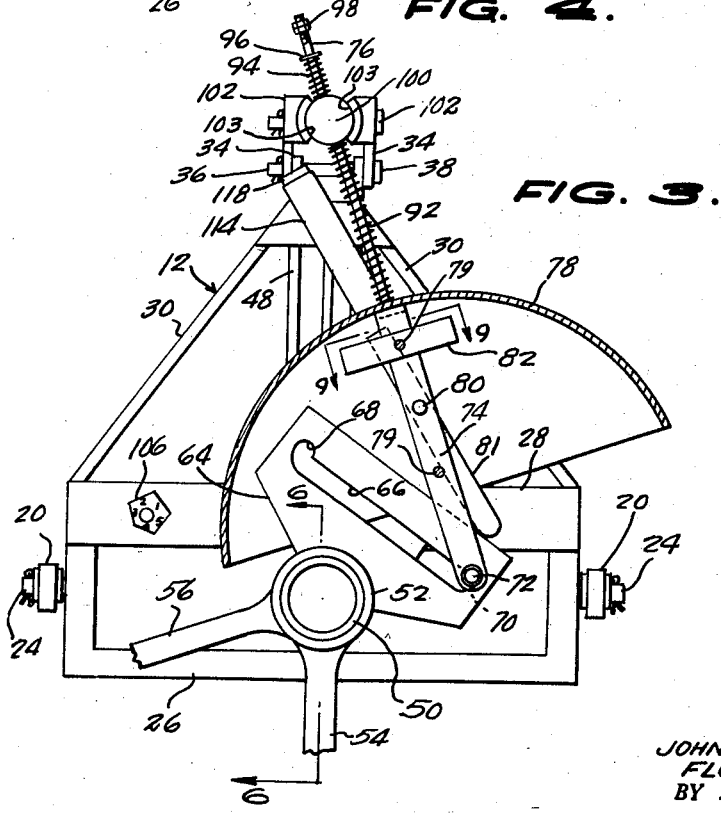

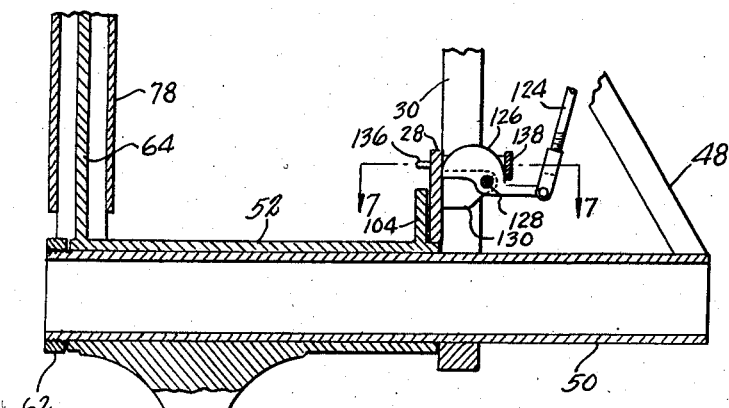
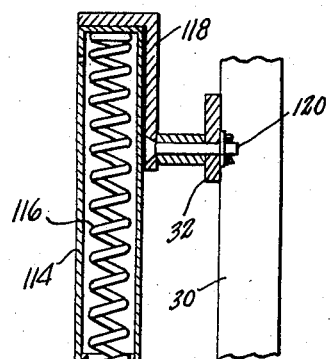
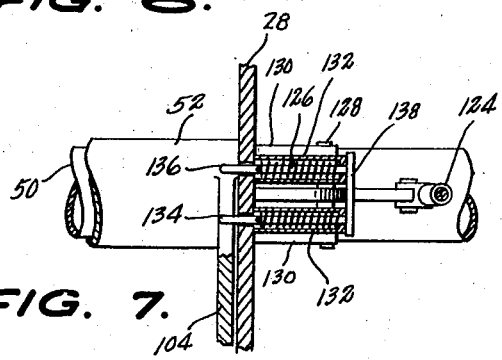
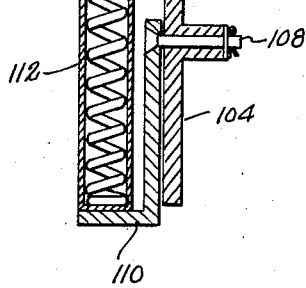

United States Patent Office 2,895,558
Patented July 21, 1959

2,895,558

AUTOMATIC REVERSING MECHANISM FOR TRACTOR-ATTACHED AGRICULTURAL IMPLEMENTS

John A. Perry and Floyd B. Perry, Wendell, and Darrell D. Perry, Pocatello, Idaho Application June 18, 1957, Serial No. 666,425

7 Claims. (Cl. 172—210)

This invention relates to agricultural implements, and more particularly has reference to an automatically operating reversing mechanism for an implement of the "hang-on" type, such as a quarter turn two-way plow, capable of being carried by any make or type of tractor having a three-point hookup and flexible depth controls.

Conventionally, an implement of the type stated includes separate ground working tools, as for example a pair of plows, connected to a common, rotary beam about which said implements are angularly spaced apart 90 degrees, more or less.

Most usually, the reversal of the assembly, for the purpose of extending one of the tools into a ground working position in place of the other tool, is effected manually, through the use of suitable handle means lockable in selected positions of rotary adjustment of the beam. In this connection, it has heretofore been proposed to provide for automatic rather than manual reversal of the implement, as for example in U.S. Patent No. 2,633,787, issued to N. A. Nelson on April 7, 1953. The present invention is directed to an improved construction operable responsive to elevation of the assembly completely out of contact with the ground, to automatically reverse the positions of the ground working tools, so that one tool which has been in a subtantially vertical ground working position will be moved out of said position, with the other tool taking its place.

A more specific object of the invention is to provide an improved structure of the character referred to adapted for mounting on a tractor having a three-point, "Ferguson System" linkage. It is proposed, in this regard, to so form and relatively arrange the cooperating parts of the structure as to automatically cause rotation of the plow beam, to which both plows or other ground working tools are fixedly secured, through 90 degrees in one direction when the entire structure is lifted out of contact with the ground on one occasion, and to effect rotation of the plow beam in like degree in an opposite direction, on the next occasion of lifting of the structure.

Yet another object is to include, in the automatically operating reversing mechanism, detent or latch means which is also automatically operative to lock the parts in each position to which they are adjusted, and which will automatically shift to an unlatching or release position each time the tool positions are to be reversed once again.

Still another object of importance is to so design the entire assembly as to facilitate its attachment to the conventional, three-point linkage hereinbefore referred to, with a minimum of difficulty and with maximum speed.

Yet another object is to provide a structure as described which will be exceptionally rugged, substantially trouble free in operation, and capable of manufacture at relatively low cost considering the benefits to be obtained from the use thereof.

Other objects will appear from the following description, the claims appended thereto, and from the annexed drawing, in which like reference characters designate like parts throughout the several views, and wherein:

Figure 3 is an enlarged end elevational view, portions being broken away, of the structure as seen from the left of Figure 2;

Figure 4 is an enlarged transverse sectional view on line 4—4 of Figure 2;

Figure 5 is an enlarged, fragmentary side elevational view of the trip assembly;

Figure 6 is a longitudinal, fragmentary sectional view, still further enlarged, on line 6—6 of Figure 3, illustrating the beam and automatic detent assembly;

Figure 7 is a detail sectional view, the scale being enlarged still further, on line 7—7 of Figure 6;

Figure 8 is an enlarged sectional view taken longitudinally through the trip or reversing assembly, substantially on line 8—8 of Figure 4; and Figure 9 is an enlarged, detail sectional view on line 9—9 of Figure 3 showing the anti-gravity control means.

A conventional tractor having a three-point hookup, such as a "Ford-Ferguson" tractor, has been generally designated at 10, with the automatically reversible, "hang-on" implement attached thereto.

Figure 2:
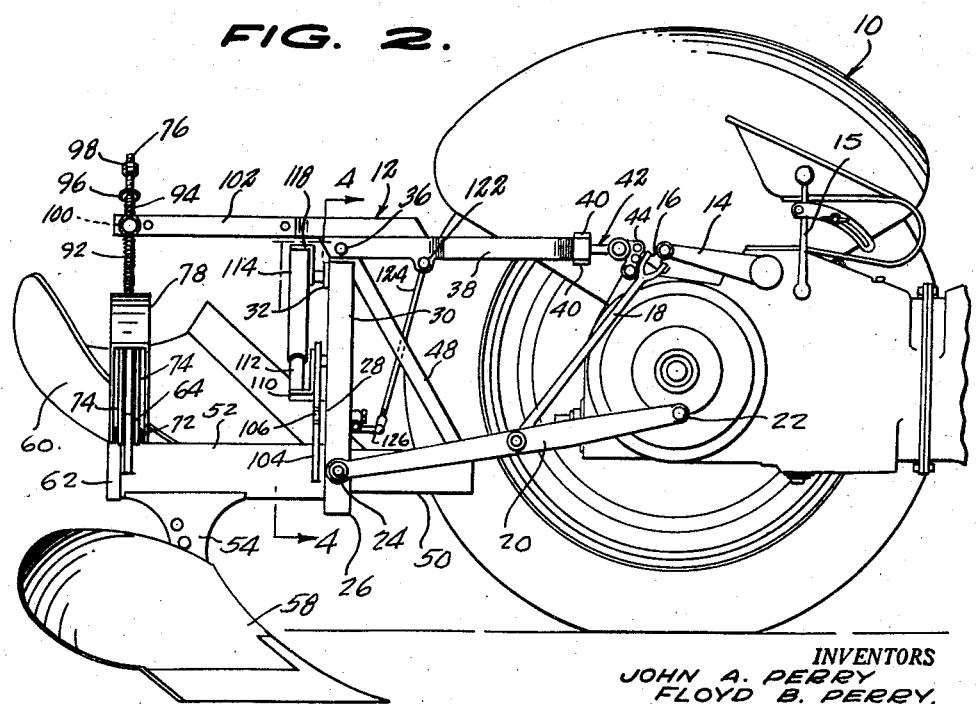
Figure 2 is a side elevational view of the structure, the tractor being shown fragmentarily.

The illustrated tractor includes the usual pair of hydraulic lift arms 14, swinging about an axis extending transversely of the tractor at the rear thereof, and swung upwardly from their normally lowered position shown in Figure 2 by means of the conventional control lever 15. Connected by universal joints 16 to the outer ends of arms 14 are links 18 extending rearwardly and declining in a direction away from the lift arms. Links 18, at their lower, outer ends, are pivotally connected to the midlength portions of elongated, laterally spaced draft or hitch links 20 pivotally connected at their forward ends at 22 to swing upon a rigid portion of the tractor frame about an axis below and paralleling that of lift arms 14.

At their rear ends hitch links 20 are pivotally connected at 24 to the wide, lower end of an A-frame 26 (Figure 4) constituting part of the present invention. A-frame 26 includes, as shown in Figures 3 and 4, a rectangular lower portion to the opposite sides of which the draft links 20 are attached, said portion including a transversely extending rub bar 28. Rigid with opposite ends of and converging in a direction upwardly from the rub bar 28 are side frame members 30 fixedly connected adjacent their upper ends by a short cross brace 32.

The A-frame, in a normal, level position of the tractor, lies in a vertical plane, and extends transversely of the reversing mechanism constituting the present invention.

Integrally formed upon the upper ends of the convergent frame members 30 are short, parallel vertical extensions 34 receiving opposite ends of a pivot pin 36 passing also through the rear ends of a pair of laterally spaced frame bars 38 projecting forwardly from the A-frame as shown at Figure 2 and having outwardly offset forward end portions fixedly connected at the front ends of bars 38 by cross pieces 40.

Figure 1:
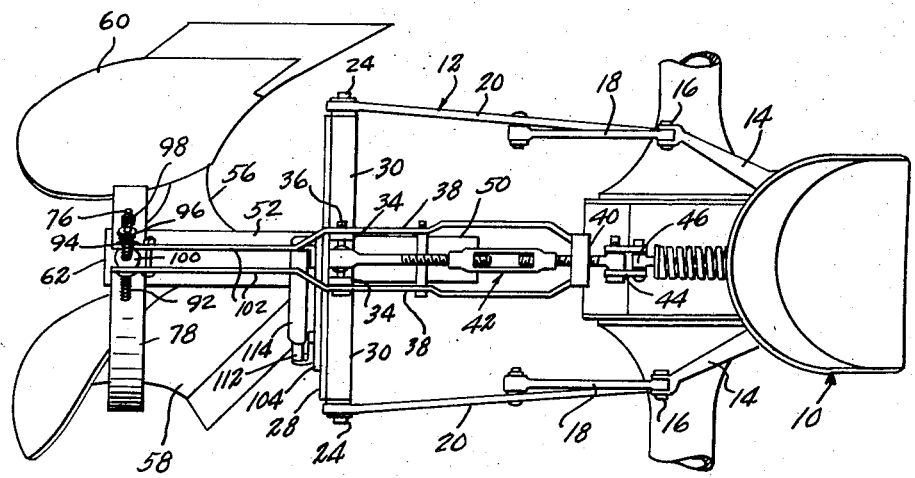
Figure 1 is a top plan view of an automatically reversing implement support structure formed according to the present invention, a tractor to which said structure is attached being shown fragmentarily.

Also pivotally connected to pin 36, as shown in Figure 1, is a turnbuckle generally designated 42, extending between the framing bars 38 and having a forward extremity pivotally attached to an angle lever or shackle 44, that is pivotally joined to a control rod 46 projecting rearwardly from the tractor and cooperating with lift arms 14 and draft links 20 to provide the three-point hookup characteristic of the "Ferguson System" linkage.

By reason of the construction so far illustrated and described, it will be apparent that in obedience to operation of the control lever 15, the lift arms 14 will be raised, and the A-frame 26 will travel upwardly from its Figure 2 position in an arcuate path, while remaining in its vertical plane, to elevate the ground working implement out of contact with the ground. The turnbuckle 42, in this regard, provides a connection at the upper end of the A-frame extending between the A-frame and the tractor A-frame extending between the A-frame and the tractor linkage, that is adjustable as to length, this being for the purpose of controlling the angularity of the A-frame, and hence the ground working implement, relative to the ground surface, thus to in turn control implement suction.

Connected to the upper end of the A-frame is a pair of inclined struts 48 (Figure 2) fixedly secured at their lower ends to the forward end of a horizontally disposed, tubular beam support bar 50, arranged longitudinally and centrally of the structure and welded intermediate its ends to the lower portion of the A-frame.

The major part of the length of the bar 50 (see Figure 6) projects rearwardly from the A-frame, and rotatable upon said portion is a beam or implement support sleeve 52. Welded or otherwise fixedly secured to sleeve 52, and angularly spaced about the circumference of the sleeve approximately 90 degrees apart, are standards 54, 56 to which are fixedly connected plow bottoms 58, 60 respectively. These are arranged so that the plow bottom 58 is a right-hand plow bottom and the plow bottom 60 is a left-hand plow bottom, this construction, considered per se, being a conventional two-way plow arragement.

At this point, it is appropriate to note that while the invention has been shown applied to a quarter-turn, two-way plow, it is intended to be applicable to any of various other ground working instruments having angularly spaced right and left hand elements that are to be selectively extendable into the ground responsive to rocking of the same about a common axis such as that defined by bar 50.

To engage the rotary sleeve against longitudinal movement in a rearward direction, the bar 50 is threaded to receive a retaining ring 62 forming an abutment (Figure 6) for the rear end of the sleeve.

Referring now to Figure 3, fixedly secured to the rear end of sleeve 52 and extending upwardly therefrom in a plane normal to the length of the sleeve, is a selection control yoke 64 formed as a flat plate having an elongated slot 66 closed at its opposite ends and communicating at said ends with short lateral slot extensions 68, 70 respectively. Slot 66 extends normally to the axis of rotation of sleeve 52, and is parallel to a line drawn tangentially of the sleeve.

A selection control fork 74 includes a pair of elongated arms the lower ends of which embrace the plate-like selection control yoke 64. Connected between said lower ends of the arms of fork 74 is a fork roller 72 extending through slot 66 and adapted to traverse the length of the slot and engage in either of the slot extensions.

At its upper end, the selection control fork 74 has a short bight portion fixedly connected to the lower end of a selection control rod 76 aligned longitudinally with and projecting upwardly from fork 74. At its lower end, the rod 76 passes through on opening formed in a flat, downwardly opening, semi-circular dust shield 78 protectively enclosing fork 74 and yoke 64 and having its side walls secured by spaced screws 79 to the respective arms of the selection control fork.

Attached intermediate its ends by a pivot pin 80 to the intermediate portion of the fork 74 is an anti-gravity control tongue 81, the lower end of which is rounded and bears against the top edge of the selection control yoke 64. As shown in Figure 9, tongue 81 extends between the arms of yoke 74, and at its upper end projects through an anti-gravity control frame 82 against the opposite ends of which abut the outer ends of compression springs 84, 86 exerting pressure against opposite sides of the anti-gravity tongue.

Circumposed about the rod 76 (Figure 3) is a selection control spring 92 abutting at one end against the dust shield 78. A cushioning spring 94 is also circumposed about rod 76, adjacent the upper end thereof, and abuts at one end against a washer 96 freely slidable upon rod 76. Above the washer, the rod is provided with a timing nut 98 threadable longitudinally of the rod 76, and lockable in selected positions to which it is adjusted by means of a jam nut also threaded on the rod 76.

The other ends of the springs 92, 94 abut against diametrically opposite locations of a ball element 100, having a diametrically extending opening through which the rod 76 is extended, the rod being freely slidable within the ball element.

Referring now to Figures 1 and 2, the turnbuckle 42, together with the associated frame bars 38, can be considered as a radius arm connected between the upper end of the A-frame and the tractor linkage. The radius arm so defined is provided with a radius arm extension 102 in the form of a pair of laterally spaced bars (see Figure 1) projecting rearwardly from the radius arm and welded at their outwardly offset, forward ends to the rear ends of the frame bars 38. The ball element 100 is engaged for universal movement between ball seats 103 (Figure 3) carried by the rear ends of the spaced bars comprising the radius arm extension 102.

The selection control yoke, fork, tongue, and rod cooperate to provide a means, as will presently appear in the discussion of the operation, for selecting the particular ground working tool 58 or 60, that is to be extended into engagement with the ground, responsive automatically to lifting of the implement out of engagement with the ground by mere operation of the hydraulic lift device of the tractor.

Means used for providing the power to rotate the quarter-turn, two-way tool in either direction, with said direction depending on the particular position of the parts of the selection control mechanism at the initiation of the lifting action, will now be described, and has been shown to particular advantage in Figures 4, 5, and 8. This means includes a crank arm 104 rigid with and extending radially, upwardly from the sleeve 52. This is formed as a flat, elongated plate in face to face contact with the rub bar 28 and swingable between a pair of limit stops 106 connected to and spaced longitudinally of the rub bar as shown in Figure 4.

The extent of travel of crank arm 104 between the stops 106 can be adjustably pre-set, due to the particular formation and mounting of the limit stops. The limit stops are formed as polygonal, in the present instance pentagonal, plates pivotally connected to the rub bar to swing about axes eccentric to the peripheries of the plates. Each side or facet of the limit stops is provided with a different number, with the numbers of corresponding sides of the respective stops corresponding to one another, thus to permit selection of limit stop positions. In the positions of the limit stops illustrated in Figure 4, the distance the crank arm 104 travels between its opposite extreme positions is reduced to a minimum.

If it is desired that the crank arm travel a longer distance, the connecting bolts by means of which the stops are attached to the rub bar are loosened, and the limit stops are rotated to present other surfaces, closer to the axes of rotation of the limit stops, to the respective opposite sides of the crank arm 104, after which the connecting bolts are tightened once again. The purpose of this arrangement is to provide for different adjustments of the implement's beam angle. This will be primarily necessary only for those who would require exactness of a perpendicular tool even though the tractor may be level at all times. Connected by a pivot pin 108 (Figure 8) to the free end of crank arm 104 is an angle bracket 110 to the free end of which is fixedly attached the closed, outer end of a tubular member 112, the other end of which is formed open and telescopes in the correspondingly open inner end of a tubular member 114, also closed at its outer end. A compression spring 116 extends within the tubes, abutting against the closed ends thereof. The tubular members 112, 114 together define a trip arm operable, responsive to expansion of the spring 116 following compression thereof, to supply the force necessary for rotating the sleeve 52 in opposite directions.

Fixedly secured to the outer end of tubular member 114 is an angle bracket 118 pivotally connected to the cross brace 32 of the A-frame at 120 (Figures 4 and 8).

Means for locking the crank arm 104, and hence the sleeve 52 and the ground working tools carried by the sleeve, in each position to which the crank arm is swung, will now be described, and is shown to best advantage in Figures 5, 6, and 7. A cam-actuating rod 124 is pivotally connected at its upper end, at 122, to the radius arm, slightly forwardly of the A-frame, and at its lower end has a pivotal connection to the forwardly projecting finger of a cam 126 (see Figure 6) having a cam surface eccentric to a pivot pin 128 on which the cam is rockably mounted, said pin extending between cam support brackets 130. At opposite sides of the cam 126, as shown in Figure 7, tubular detent housings 132 are provided, these being fixedly secured to the rub bar 28.

Extending within the housings 132, and slidable in openings formed in the rub bar 28, are detents 134, 136, projecting rearwardly from the rub bar in the path of swinging movement of the crank arm 104. The detents are spring biased, under normal conditions, to their extended positions, and as will be seen from Figure 4, respectively serve to engage the crank arm 104, in cooperation with the limit stops 106, against movement from either of its extreme positions.

The cam 126, responsive to rocking thereof in a clockwise direction in Figure 6 from its normal position shown in Figure 6, is adapted to retract the detents, as the crank arm is to begin its movement. For this purpose, there is provided a crossbar 138 fixedly secured to and connected between the detents, in engagement with the surface of cam 126, it being noted from Figure 6 that when the cam is rocked in the manner described, the cross bar 138 will be shifted to the right in Figure 6, to retract detents 134, 136 against the restraint of their associated springs. Rocking of the cam in the manner referred to, of course, takes place when the rod 124 is shifted downwardly, or rather, when the cam is bodily shifted upwardly relative to the rod 124.

In use, and assuming that as shown in Figure 2, tool 58 is in engagement with the ground, and it is desired to reverse the tools to dispose, instead, tool 60 in ground working position, the tractor operator, without leaving his seat, shifts control handle 15, to cause the lift arms 14 to swing upwardly.

As a result, the A-frame will be swung upwardly, while being held against tilting from its predetermined angularity to the ground surface.

This of course results in lifting of tool 58 out of the ground, and while the tool is being so lifted, the radius arm extension 102, and the radius arm 38, will swing upwardly to inclined positions, with the outer end of extension 102 traveling in an arcuate path, in a clockwise direction in Figure 2. Initially, with the timing nut 98 having been previously adjusted to a selected position along the length of selection control rod 76, the washer 96 will not be in contact with the timing nut. As the lifting continues, the washer contacts the nut, after which the radius arm extension will fully compress spring 94, and apply lifting force to the timing nut, the tool 58 being now almost out of the ground.

Since, during this stage of the operation, the ball element 100 has traveled upwardly along the length of control rod 76, the selection control spring 92 (see Figure 3) will have lost its tension. Ordinarily this loss of tension would cause the roller 72, by reason of the normal tendency of fork 74 and rod 76 to gravitate to their lowermost positions, to drop momentarily out of slot extension 70 as the lift continues. The anti-gravity control tongue 81 prevents this from occurring since, by comparing Figures 3 and 9, it will be seen that spring 84 will, in the Figure 3 position of the parts, exert lateral pressure against one side of the gravity control tongue, tending to swing the same clockwise in Figure 3 about its pivot 80, with this motion of the tongue being translated into a force exerted upwardly against the fork 74 through the pivot 80, tending to prevent gravitation of the fork. The spring 86 will not be exerting pressure against the other side of tongue 81 under these circumstances, since it is of a diameter effective to cause it to engage against the adjacent side edges of the arms of the fork 74, in spaced relation to the adjacent side of tongue 81.

With the roller 72 held firmly, at this stage, within slot extension 70, and with selection control spring 92 decompressed, and with lifting force being applied to the control rod 76 at the location of the timing nut, the process of selection of the opposite ground working tool 60 begins, that is to say, sleeve 52 begins to rotate counterclockwise in Figure 3 due to the fact that the elevation of the fork 74 tends to rotate selection control yoke 64 counterclockwise in this figure of the drawing.

As soon as rotation of the sleeve 52 begins, the trip or power spring 116 (Figure 8) begins to compress, since the crank arm 104 is beginning to travel counterclockwise in Figure 4, causing an initial upward movement of its free end, resulting in movement of tubular member 112 inwardly of tubular member 114. Compression of spring 116 continues until the yoke 64, and hence the crank arm 104, are in fully vertical positions, midway between their extreme positions of arcuate movement. If this is the maximum of the lifting action of the tractor lift arms 14, then the timing nut is threaded downwardly along rod 76 at this time, and is locked with its jam nut at a point at which the action of the timing nut would rotate yoke 64 just slightly past the mentioned vertical or dead center position.

The spring 116 is thus moved across a dead center and being now free to expand, exerts downward pressure against the free end of crank arm 104, which also has moved past a dead center, forcing the crank arm against the limit stop 106 shown at the left in Figure 4. This effects a full reversal of the positions of the tools 58, 60, with tool 60 now being in a ground working position.

When the yoke 64 is rotated to its dead center position, the tongue 81 will be centered between the springs 84, 86, so that it no longer exerts pressure against the yoke 64 tending to hold the roller 72 in slot extension 70. Then, as the structure is again lowered into the ground, by lowering the tractor lift handle 15, the fork 74 swings at its free end to the other end of slot 66, roller 72 engaging in the slot extension 68 to recock the trip mechanism, ready for the next reversal of the tool position.

It should be noted that it is necessary to adjust the timing nut only for the first time it is used on a tractor on which the illustrated structure is mounted. This is necessary because all tractors may not have equal height of lift. Subsequently, the nut is left in its selected position, and it is not thereafter necessary for the tractor operator to leave his seat.

Reference should now be had to the detent or locking assembly. As the radius arm 38 begins to swing upwardly at the initiation of the tool reversal operation, the A-frame will of course be bodily lifted upwardly, with the A-frame traveling a distance, over its entire length, equal to the distance the outer end of radius arm 38 is traveling upwardly, this being true because the A-frame is directly connected at 36 to the radius arm 38.

The cam 126, accordingly, is bodily elevated a distance equal to that which the outer end of arm 38 travels. However, since rod 124 is closer to the pivot axis of arm 38 than is the A-frame, the rod will not travel as great a distance upwardly as that which the A-frame travels, and this is translated into a downward pressure against the finger of the cam, rotating the cam clockwise in Figure 6 about its axis. The detents 134, 136, are thus retracted, this occurrring as the tool 68 begins to come out of the ground. The crank arm 104 is thus free to travel between the respective extreme positions thereof.

As the rotation of the cam 126 continues, the tool reversing operation begins, and the cam continues to rotate. However, as shown in Figure 6, it is so constructed as to not, at this time, exert further pressure against cross bar 138 of the detents, since a portion of the cam surface is concentric with the axis of rotation of the cam, this being the portion now engaged against the cross bar 138.

After reversing of the beam or sleeve 52 is completed, and the slackening of the downward pressure on the free end of the cam actuating rod 124 permits the cam to return to its normal, Figure 6 position, the springs associated with the detents expand, extending the detents once again to lock the crank arm 104 in its new position.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a tractor attachment the combination, with an implement lifting means of a tractor, of a generally vertical frame connected to said means to be lifted thereby; tool support means rotatably mounted on and projecting rearwardly from the frame; a pair of angularly spaced ground working tools carried by the support means; mechanism connected between the frame and tool support means operative responsive to elevation of the frame to impart rotary motion to the tool support means through an angular distance about the axis of rotation thereof past a dead center but less than the angular distance that the tools are spaced apart, said mechanism including an arm projecting rearwardly from the frame and connected thereto for elevation therewith, rod means extending downwardly from the arm and elevatable therewith, a selection control plate lying transversely of the tool support means and connected to the tool support means for rotation therewith, said plate having an elongated, straight slot extending transversely of said axis, and a connection between the rod means and plate slidably engaged in the slot and connected to the rod means for elevation therewith, for rocking of the plate responsive to elevation of said connection with the rod means; and resilient, yielding means connected between the frame and tool support means, said resilient, yielding means being compressed and carried through said dead center on rotation of the tool support means through the first named angular distance, said last named means on movement thereof through said dead center exerting a force against the tool support means sufficient to rotate the same through the remainder of the second named angular distance.

2. In a tractor attachment the combination, with an implement lifting means of a tractor, of a generally vertical frame connected to said means to be lifted thereby; tool support means rotatably mounted on and projecting rearwardly from the frame; a pair of angularly spaced ground working tools carried by the support means; mechanism connected between the frame and tool support means operative responsive to elevation of the frame to impart rotary motion to the tool support means through an angular distance about the axis of rotation thereof past a dead center but less than the angular distance that the tools are spaced apart including an arm projecting rearwardly from the frame approximately parallel to the tool support means, said arm being connected to the frame for elevation therewith, rod means having a universal connection to the arm and extending downwardly therefrom, a selection control plate rigid with and lying transversely of the tool support means, said plate having an elongated, straight slot extending transversely of the axis of rotation of the tool support means, and a connection between the rod means and plate slidably engaged in the slot and connected to the rod means for elevation therewith, for rocking of the plate responsive to elevation of said connection with the rod means; resilient yielding means connected between the frame and tool support means, said resilient, yielding means being compressed and carried through said dead center on rotation of the tool support means through the first named angular distance, said last named means on movement thereof through said dead center exerting a force against the tool support means sufficient to rotate the same through the remainder of the second named angular distance; and detent means carried by said frame normally engaging the resilient, yielding means in opposite, extreme positions to which the resilient, yielding means is moved to lock the same in said extreme positions, said detent means being operable to positions in which the resilient, yielding means is freed for movement, responsive to elevation of the frame.

3. In an implement for attachment to a tractor having a lift linkage, a generally vertical frame adapted to be connected to said linkage for elevation thereby; a tool assembly rotatably mounted on and projected rearwardly from the frame and including a pair of ground working tools angularly spaced about the axis of rotation of said assembly; mechanism connected between the frame and said assembly operative responsive to elevation of the frame to impart rotatable movement to said assembly from a first position in which one of the tools is disposed for engagement with the ground toward a second position in which the other tool is disposed for engagement with the ground, through a distance less than the full extent of angular travel of said assembly about its axis of rotatable movement, but past a dead center; said mechanism including arm means connected at one end to the lift linkage, said arm means projecting substantially horizontally rearwardly from and having a pivotal connection intermediate its ends to the upper portion of the frame, said assembly extending rearwardly from and having a pivotal connection to the lower portion of the frame, said assembly extending in generally parallel relation to the arm means, a rod having a universal connection to the other end of the arm means and extending downwardly from the arm means, a selection control plate rigid with said assembly and disposed transversely of the assembly, said plate having an elongated slot extending transversely of the assembly and disposed wholly above the axis of rotation thereof in both of said tool positions, and a connection between the rod and plate rigidly joined at one end to the rod and slidably engaged in the slot at its other end, for rocking of the plate and assembly about said axis responsive to elevation of the frame; and resilient, yielding means connected between the frame and said assembly passing through said dead center on rotation of the assembly by said mechanism, said means on movement thereof through said dead center exerting a force against the assembly sufficient to further rotate the same fully to its second position.

4. In an implement for attachment to a tractor having a lift linkage, a generally vertical frame adapted to be connected to said linkage for elevation thereby; a beam support bar carried by said frame; a tool assembly including a beam rotatably mounted on the beam support bar and a pair of ground working tools rigid with and spaced circumferentially about said beam; mechanism connected between the frame and beam operative responsive to elevation of the frame to impart rotatable movement to said beam from a first position in which one of the tools is disposed for engagement with the ground toward a second position in which the other tool is disposed for engagement with the ground, through a distance less than the full extent of angular travel of said assembly about its axis of rotatable movement, but past a dead center; said mechanism including arm means having a pivotal connection at one end to the lift linkage, the arm means extending approximately horizontally rearwardly from the frame and having a pivotal connection intermediate its ends to the upper portion of the frame for conjoint elevation of the arm means and frame by said linkage, a rod having a universal connection to the other end of the arm means and extending downwardly from the arm means, a yoke rigid with and extending downwardly from the rod, a generally vertical selection control plate straddled by the yoke, said plate being rigid with and disposed transversely of the beam, said plate having an elongated, straight slot extending transversely of the beam and disposed wholly above the beam in both of said tool positions, the slot at its opposite ends having upwardly directed extensions, and a pin on the yoke slidably engaged in said slot and disposed within the respective extensions of the slot in the respective tool positions, for rocking of the plate to rotate the beam in response to said elevation of the frame; and resilient, yielding means connected between the frame and beam passing through said dead center on rotation of the beam by said mechanism, said means on movement thereof through said dead center exerting a force against the beam sufficient to further rotate the same fully to its second position.

5. In an implement for attachment to a tractor having a lift linkage, a frame adapted to be connected to said linkage for elevation thereby; a beam support bar carried by said frame; a tool assembly including a beam rotatably mounted on the bar and a pair of ground working tools rigid with and spaced circumferentially about said beam; an articulated control linkage connected between the frame and beam, operative to translate upward movement of the frame into rotatable movement of the beam from a first position in which one of the tools is disposed for engagement with the ground, through a distance less than the full extent of angular travel of said assembly about its axis of rotatable movement, but past a dead center; and resilient, yielding means connected between the frame and beam passing through said dead center on rotation of the beam by the control linkage, said means on movement thereof through said dead center exerting a force against the beam sufficient to further rotate the same in the same direction, to a second position in which the other tool is disposed for engagement with the ground.

6. In an implement for attachment to a tractor having a lift linkage, a frame adapted to be connected to said linkage for elevation thereby; a beam support bar carried by said frame; a tool assembly including a beam rotatably mounted on the bar and a pair of ground working tools rigid with and spaced circumferentially about said beam; an articulated control linkage connected between the frame and beam, operative to translate upward movement of the frame into rotatable movement of the beam from a first position in which one of the tools is disposed for engagement with the ground, through a distance less than the full extent of angular travel of said assembly about its axis of rotatable movement, but past a dead center; and resilient, yielding means connected between the frame and beam passing through said dead center on rotation of the beam by the control linkage, said means on movement thereof through said dead center exerting a force against the beam sufficient to further rotate the same in the same direction, to a second position in which the other tool is disposed for engagement with the ground, said control linkage including a yoke rigid with the beam, and elongated means connected at one end to the yoke and carried by the frame at its other end, said elongated means being adapted when elevated with the frame to rock the yoke for rotating the beam.

7. In an implement for attachment to a tractor having a lift linkage, a frame adapted to be connected to said linkage for elevation thereby; a beam support bar carried by said frame; a tool assembly including a beam rotatably mounted on the bar and a pair of ground working tools rigid with and spaced circumferentially about said beam; an articulated control linkage connected between the frame and beam, operative to translate upward movement of the frame into rotatable movement of the beam from a first position in which one of the tools is disposed for engagement with the ground, through a distance less than the full extent of angular travel of said assembly about its axis of rotatable movement, but past a dead center; and resilient, yielding means connected between the frame and beam passing through said dead center on rotation of the beam by the control linkage, said means on movement thereof through said dead center exerting a force against the beam sufficient to further rotate the same in the same direction, to a second position in which the other tool is disposed for engagement with the ground, said control linkage including a yoke rigid with the beam, and elongated means connected at one end to the yoke and carried by the frame at its other end, said elongated means being adapted when elevated with the frame to rock the yoke for rotating the beam, said yoke having an elongated slot, said one end of the elongated means being adapted to traverse the length of the slot following rocking of the yoke, the other end of said elongated means having a slidable, pivotal connection to the frame.

References Cited in the file of this patent

UNITED STATES PATENTS

| 2,543,786 | Lindeman | Mar. 6, 1951 |

FOREIGN PATENTS

| 167,344 | Australia | Mar. 29, 1956 |
| 655,765 | France | Dec. 22, 1928 |
| 678,376 | Great Britain | Sept. 3, 1952 |
| 709,791 | Great Britain | June 2, 1954 |
| 730,001 | Great Britain | May 18, 1955 |
| 236,949 | Switzerland | July 16, 1945 |